United States Patent [19]

Copeland, III

[11] 3,711,840

[45] Jan. 16, 1973

[54] WRITE CIRCUIT USING ENHANCED PROPAGATION PULSES FOR LATERAL DISPLACEMENT CODING OF PATTERNS OF SINGLE-WALL MAGNETIC DOMAINS

[75] Inventor: John Alexander Copeland, III, Gillette, N.J.

[73] Assignee: Bell Telephone Laboratories, Inc., Murray Hill, N.J.

[22] Filed: Dec. 13, 1971

[21] Appl. No.: 207,252

[52] U.S. Cl. ........................340/174 TF, 340/174 SR

[51] Int. Cl. ..........................G11c 11/14, G11c 19/00

[58] Field of Search ..................................340/174 TF

[56] References Cited

UNITED STATES PATENTS 3,646,530 2/1972 Chow..............................340/174 TF 3,534,346 10/1970 Bobeck...........................340/174 TF 3,636,531 1/1972 Copeland........................340/174 TF 3,638,205 1/1972 Copeland........................340/174 TF

*Primary Examiner*—Stanley M. Urynowicz, Jr.

*Attorney*—R. J. Guenther et al.

[57] ABSTRACT

A "write" feature is incorporated into the prcpagation circuitry of a lateral displacement shift register by reducing the lateral dimensions of the serpentine propagation conductor pattern at predetermined "-write" positions along the propagation channel. Enhancement of amplitude of a selected propagation pulse creates a lateral force sufficient to displace a domain at such a position to a side of the channel determined by the polarity of the enhanced pulse.

10 Claims, 4 Drawing Figures

WRITE CIRCUIT USING ENHANCED PROPAGATION PULSES FOR LATERAL DISPLACEMENT CODING OF PATTERNS OF SINGLE-WALL MAGNETIC DOMAINS

BACKGROUND OF THE INVENTION

1. Field Of The Invention

This invention relates to single-wall magnetic domain apparatus and, more particularly, to a domain propagation channel arrangement suitable for lateral displacement coding.

2. Prior Art

Two somewhat diversified approaches have developed in the art of single-wall magnetic domain technology for controllably propagating domains about in a layer of material.

One approach has favored the development of field-accessed apparatus in which domains are moved about in the layer of material in response to a common magnetic field reorienting in the plane of the layer. The other approach has advocated the development of conductor pattern geometries for realizing domain movement through localized field gradients at positions consecutively offset from positions occupied by domains. These field gradients are generally produced by applying a sequence of pulses to an array of conductor loops consecutively offset from a position occupied by a domain.

The principal advantage of the field-access technique lies in the relative facility with which propagation energy is coupled through a common magnetic field to the individual domains. Since all of the domains are controllably moved about in the layer of material under the influence of but a single reorienting magnetic field, a minimum of external connections are required to access the individual domains. However, a distinct disadvantage of the field-access technique also lies in this same feature. Manipulation of selected patterns of domains cannot be achieved without displacing neighboring patterns of domains in a like manner. Consequently, some rather sophisticated overlay geometries are required to dynamically store or "idle" neighboring domains while a selected pattern of domains is being operated upon.

The problem of selectivity is largely avoided in the conductor pattern method of propagating domains, because localized field patterns are generated which extend over rather limited areas of a layer of material. As a result, logic and storage operations are carried on in selected areas of the layer without inducing like movement in neighboring patterns of domains.

In the early stages of the conductor pattern technology, conductor arrays usually comprised three sets of serially interconnected conductor loops alternately spaced to provide the familiar three-phase shift register operation. An example of such a pattern is shown in U.S. Pat. No. 3,460,116, issued Aug. 5, 1969 to A. H. Bobeck, U. F. Gianola, R. C. Sherwood and W. Shockley.

In practice, implementation of the three-phase mode of domain propagation is usually limited by the maximum density of conductors that can be deposited upon a given area of a layer of material. This limitation has led to the recent development of a more attractive domain propagation arrangement that enables domains to be moved along a propagation channel defined by either a magnetically soft rail or a serrated groove on the surface of a layer of suitable magnetic material. The channel is of a geometry to define stable locations to either side thereof, permitting a domain at a location on one side of the channel to represent, illustratively, a binary "0" and a domain at the opposite location to represent a binary "1."

Propagation along the longitudinal axis of the channel is achieved through a single, continuous, serpentine, propagation conductor which criss-crosses the channel in a plane that is parallel to and insulated from the channel. Pulsation of the propagation conductor generates consecutively offset magnetic fields along the longitudinal axis of the channel. These magnetic fields cause a pattern of domains located under the channel to move along the channel at a sequence of stable positions or stages defined by consecutive crossings of the channel by the conductor. When the conductor is excited with pulses of alternating polarities, a domain moves from one stable position to the next.

An example of such an apparatus is shown and described in application, Ser. No. 49,273, filed June 24, 1970 for J. A. Copeland III, and assigned to Bell Telephone Laboratories, Incorporated, now U.S. Pat. No. 3,636,531, issued Jan. 18, 1972.

A variety of advantages arise from such an arrangement when the channel is closed upon itself in a loop geometry and operated in a mode in which information recirculates about the loop. The close-loop configuration is normally operated with a domain at a reference location to one side of the channel at each position or stage of the loop. "Write" points for reading information into the channel at selected positions are provided by depositing conductor loops in close proximity to the selected positions. Each conductor loop is oriented in a manner so that exciting the loop with a current pulse induces a magnetic field which generates a lateral force sufficient to displace a domain at that position to a side of the channel depending upon the polarity of the pulse. This type of information storage system is known in the art as lateral displacement coding or double-rail logic.

A principal advantage of such a double-rail system is that domains are conserved in the system, because it is required neither to continually generate nor annihilate domains. Moreover, the presence of a domain at each position capitalizes on interaction forces between domains to provide a relatively rigid propagation system that permits relatively close domain spacing and, thus, a high packing density. It is another advantage that the number of external conductors required to implement the system is greatly reduced by the utilization of but a single propagation conductor.

However, nonwithstanding the contributions that have already been made, the high density of external connections required to implement such conductor pattern circuits remains a significant problem.

It is, therefore, an object of this invention to reduce the number of externally connected conductors required to implement lateral displacement coding in a single-wall domain apparatus.

It is another object of this invention to reduce the number of conductors in such an apparatus by providing conductors which implement dual functions.

It is still another object of this invention to provide in such an apparatus a propagation conductor with a geometry suitable for also providing an information "-write" function.

It is yet another object of this invention to provide a propagation conductor geometry that effects the "-write" function at selected positions in a domain propagation channel in response to an amplitude-coded propagation pulse.

SUMMARY OF THE INVENTION

The invention lies in the incorporation of a "write" feature into the propagation circuitry of a domain propagation channel suitable for lateral displacement coding. The "write" feature is achieved by reducing the lateral dimensions of the serpentine propagation conductor pattern at first and second channel positions by a sufficient amount to produce magnetically induced forces tending to laterally displace domains at the positions when the propagation conductor is excited with enhanced current pulses of alternating polarities.

Normally, the alternating propagation pulses are of insufficient amplitude to cause lateral displacement of domains at any of the channel positions. However, selective displacement of domains is achieved at "-write" positions by enhancing the amplitudes of predetermined propagation pulses a sufficient amount to overcome the internal magnetic fields of the channel. Domains at the "write" positions are laterally displaced to sides of the channel depending upon the polarities of the enhanced pulses.

DETAILED DESCRIPTION OF THE INVENTION

Figure 1:
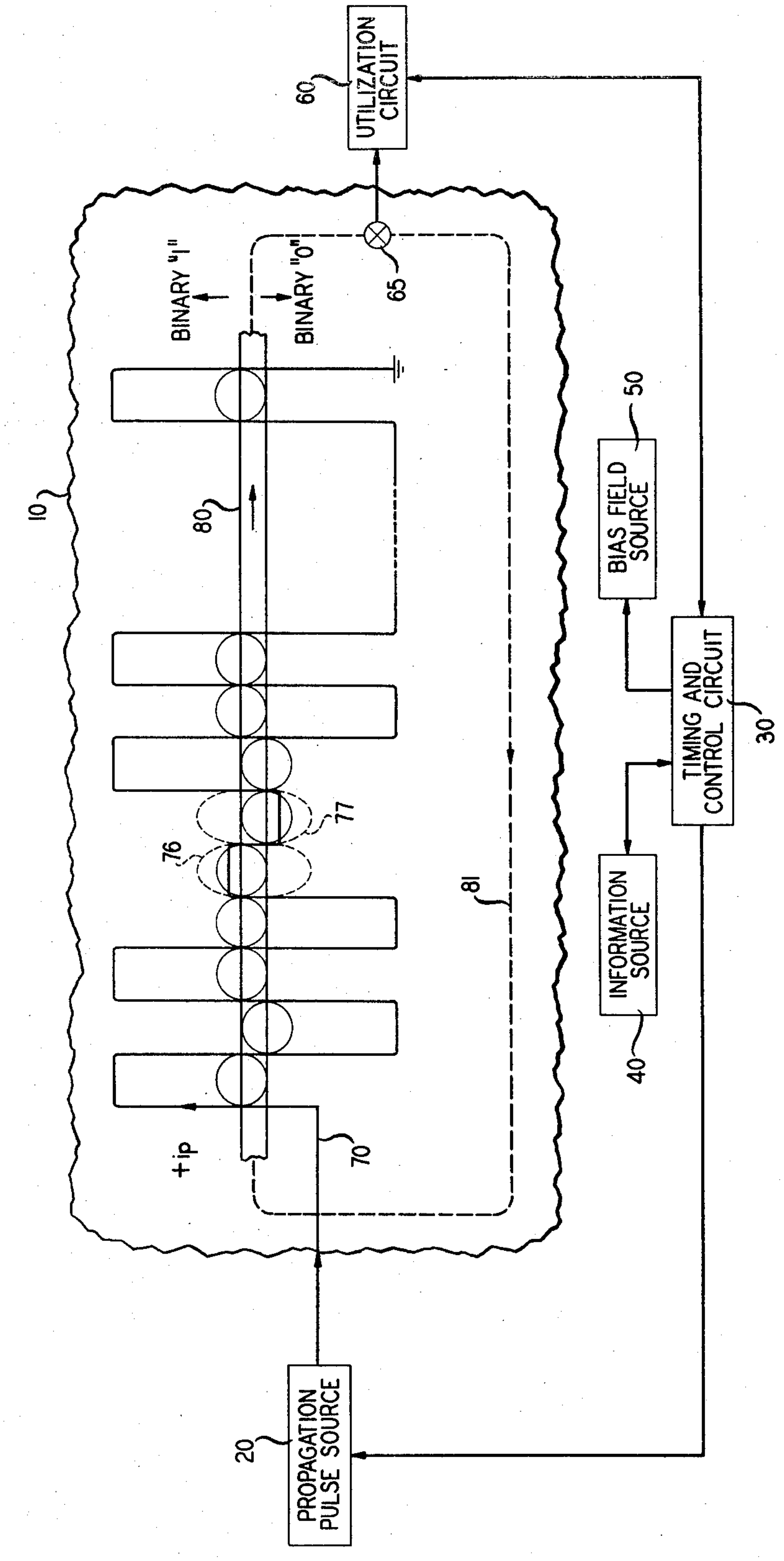
FIG. 1 depicts a schematic illustration of a domain propagation arrangement comprising a magnetically soft rail criss-crossed by a serpentine propagation conductor featuring "write" positions in accordance with the invention.

FIG. 1 shows a closed-loop domain propagation channel suitable for lateral displacement coding of single-wall magnetic domains in a layer 10 of appropriate material. The channel comprises a magnetically soft strip or rail 80 aligned adjacent the surface of layer 10 with an axis illustratively represented by broken line 81. Rail 80 is repeatedly criss-crossed in the plane of layer 10 by a propagation conductor 70 having a serpentine geometry. Conductor 70 is advantageously deposited on an insulating substrate juxtaposed with the surface of layer 10.

The repeated crossings of rail 80 by propagation conductor 70 define consecutive domain positions along the rail. If the width of rail 80 is suitably less than the diameter of the domains in layer 10, stable locations for the domains are defined on either side of the rail at each position along the rail. These stable locations are such that a domain at, for example, the upper location at any position along the rail is tangent to the lower side of the rail at that position. If the domain were instead at the lower location at that position, it would be tangent to the upper side of the rail. Domains tangent to the lower side of the rail move from location to location along the lower side in response to a train of pulses of alternating polarity. Domains tangent to the upper side of the rail move from location to location along the upper side in response to the same train.

A double-rail information storage and retrieval system in which domains are conserved is effected by combining a utilization circuit, represented by block 60, a bias field source, represented by block 50, an information source, represented by block 40, a suitable timing and control circuit, represented by block 30, and a propagation pulse source, represented by block 20, with the closed-loop channel in the manner depicted in FIG. 1.

Domains are advantageously provided at each of the consecutive positions along rail 80 by applying to conductor 70 a train of positive and negative pulses that have amplitudes which are an order of magnitude larger than the amplitudes of normal propagation pulses. The effect of these pulses is to attract and split random domains which are always present in the layer of material under the rail. This train of pulses is applied until domains have initially located along either side of the rail at each of the consecutive positions along the rail. The domains are then propagated from position to position along the channel by applying to conductor 70 a similar train of propagation pulses with a much smaller amplitude.

Information is "written" into the system at predetermined "write" positions 76 and 77, each of which comprises a domain position defined by consecutive crossings of rail 80 by serpentine conductor 70. These"write" positions may be adjacent one another, as shown in FIGS. 1–4, or may be spaced by any number of domain positions similarly defined by consecutive crossings of rail 80 by conductor 70. "Write" positions 76 and 77 distinguish from the other domain positions in that the lateral dimensions, of the conductor pattern geometry defining the "write" positions, are reduced a sufficient amount to produce a magnetically induced force tending to laterally displace domains at the "-write" positions from one side of the rail to the other whenever propagation conductor 70 is appropriately pulsed. At all of the positions other than the "write" positions, the lateral dimensions of the serpentine conductor pattern are sufficiently large, with respect to the lateral dimensions of the "write" positions, for the magnetically induced force to be of an insufficient strength in the proximity of the rail to cause lateral displacement of domains from one side of the rail to the other in response to ordinary propagation pulses.

"Write" position 76 is characterized by a half-loop of conductor 70 on the upper side of rail 80 and is used to displace a domain moving into that position from the lower side to the upper side of the rail when conductor 70 is excited with a pulse of enhanced amplitude and positive polarity. "Write" position 77 is characterized by a half-loop of conductor 70 on the lower side of rail 80 and is used to displace a domain at that position from the upper side to the lower side of the rail when conductor 70 is excited with a similarly enhanced pulse of negative polarity. The direction of the magnetically induced displacement force is determined by the polarity of the propagation pulses according to the familiar "right-hand rule." If the domains are considered to have positive magnetization and the remainder of the layer of material to have negative magnetization in the plane of the drawings, a positive propagation current pulse, would create a magnetically induced force tending to move a domain from the lower side to the upper side of the rail at "write" position 76, and a negative propagation pulse would create a force tending to move a domain from the upper side to the lower side of the rail at "write" position 77. The direction of positive current flow in conductor 70 is indicated by $+i_p(+i_p')$ in FIGS. 1–4.

As mentioned above, the normal positive propagation pulses are of insufficient amplitude to create a magnetically induced force of sufficient strength to displace domains from the lower (upper) side of the rail to the upper (lower) side of the rail at any of the positions along the rail. However, when conductor 70 is pulsed with a positive propagation pulse of a suitably enhanced amplitude, a domain moving on the lower side of rail 80 into "write" position 76 in response to the pulse experiences a force tending to displace it to the upper side of the rail at that position. Thus, selective displacement of a domain from the lower to the upper side of the rail at "write" position 76 is achieved only by enhancing or increasing the amplitude of a predetermined positive pulse by a sufficient amount to overcome the internal magnetic fields of the rail and cause the domain to be displaced to the upper side of the rail at that position. Of course, a domain moving into "write" position 76 on the upper side of the rail remains materially unaffected by either a selectively enhanced positive propagation pulse or a normal positive propagation pulse.

Similarly, a domain moving along the upper side of the rail into "write" position 77 is displaced to the lower side of the rail at that position by a negative propagation pulse with a sufficiently increased amplitude. And, as should be expected, a domain already moving along the lower side of the rail into "write" position 77 remains on the lower side of the rail whether the negative propagation pulse is enhanced or not.

Figure 2:
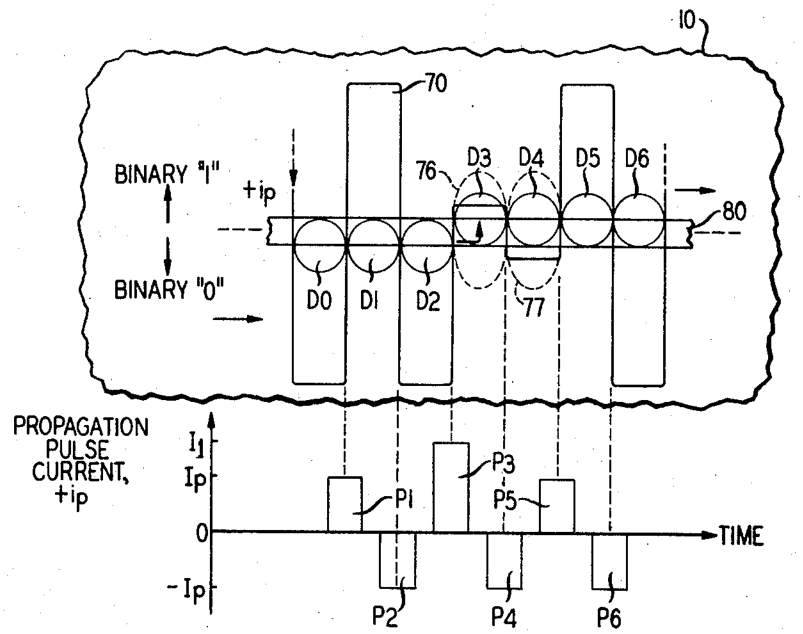
FIG. 2 shows the pulse-by-pulse progress of a single domain initially representing a binary "0" as it propagates through the "write" positions in response to a propagation pulse train for "writing" a binary "1."

The "writing" operation is illustrated in more detail in FIG. 2, which teaches the "writing" of a binary "1." FIG. 2 shows an amplitude versus time plot of a propagation pulse train $i_p$ with pulses $P_1$, $P_2$, $P_3$, $P_4$, $P_5$, and $P_6$ of alternating polarity, for moving a domain from an initial position $D_0$ to successive positions $D_1$, $D_2$, $D_3$, $D_4$, $D_5$, and $D_6$, respectively. Each of the pulses, with the exception of $P_3$, has an amplitude $I_p$ that is sufficient to propagate a domain to the next consecutive position along rail 80.

Serpentine conductor 70 extends a sufficient distance from the rail in both lateral directions at all of the domain positions along rail 80 to ensure that pulses of amplitude $I_p$ are of insufficient amplitude to laterally displace domains in either direction as they propagate along the rail in response to propagation pulse train $i_p$. As a result, domains on both the lower and upper sides of the rail propagate right on through "write" positions 76 and 77, as well as through each of the other positions, in response to positive and negative pulses of amplitude $I_p$, without being deflected to the opposite side of the rail. However, if positive pulse $P_3$ is enhanced to a sufficient amplitude $I_1$, as shown in FIG. 2, a domain propagating into "write" position 76 on the lower side of the rail is displaced to the upper side of the rail at that position. Amplitude $I_1$, must, of course, be limited in amplitude to the extent that pulse $P_3$ is of insufficient amplitude to cause lateral displacement of domains at any of the positions along the rail other than "write" position 76. Naturally, a domain on the upper side of the rail propagates right on through "write" position 76 without being laterally displaced to the lower side of the rail, whether pulse $P_3$ has an enhanced amplitude or not.

Figure 3:
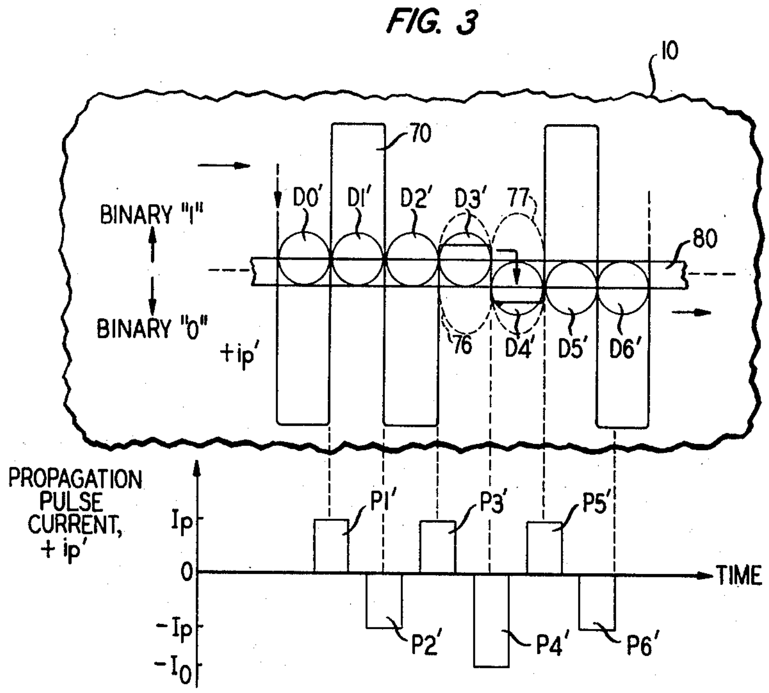
FIG. 3 illustrates the pulse-by-pulse progress of a single domain initially representing a binary "1" as it propagates through the "write" positions in response to a propagation pulse train for "writing" a binary "0."

FIG. 3 illustrates the writing of a binary "0" at "-write" position 77. As in FIG. 2, FIG. 3 details serpentine conductor 70 and rail 80 in the neighborhood of "-write" positions 76 and 77. In addition, FIG. 3 depicts an amplitude versus time plot of a propagation pulse train $i_p'$ with pulses $P_1'$, $P_2'$, $P_3'$, $P_4'$, $P_5'$, and $P_6'$ of alternating polarity, for moving a domain from an initial position $D_0'$ to successive positions $D_1'$, $D_2'$, $D_3'$, $D_4'$, $D_5'$, and $D_6'$, respectively.

Initially, the domain moves along the upper side of rail 80 through positions $D_1'$, $D_2'$, and $D_3'$. However, when the amplitude of negative pulse $P_4'$ is enhanced a sufficient amount to an amplitude $I_0$ (corresponding to $I_1$), the domain is displaced to the lower side of rail 80 in response to pulse $P_4'$ as the domain moves from position $D_3'$ to position $D_4'$. Again, the domain is not displaced to the lower side of the rail if the amplitude of negative pulse $P_4'$ is not enhanced to an amplitude $I_0$ from a normal amplitude of $I_p$. And, of course, domains moving along the lower side of the rail are not displaced by either a normal negative propagation pulse of amplitude $I_p$ or an enhanced pulse of amplitude $I_0$.

Figure 4:
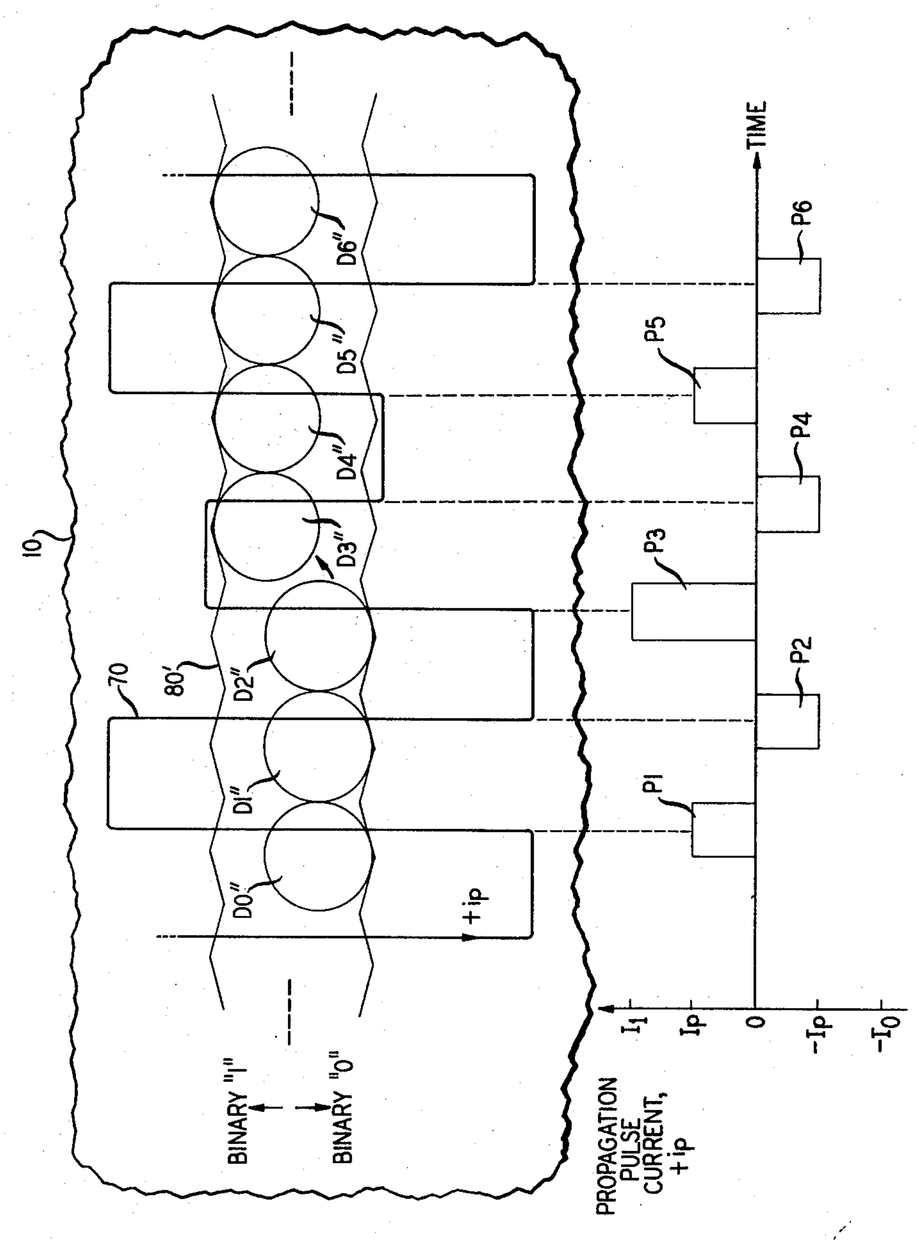
FIG. 4 depicts the pulse-by-pulse progress of a single domain initially representing a binary "0" as it propagates through "write" positions in a propagation channel defined by a serrated groove in response to a propagation pulse train for "writing" a binary "1."

FIG. 4 depicts a similar "writing" arrangement in which rail 80 is replaced by a serrated groove 80' of a predetermined depth and width in layer of material 10. The geometry of groove 80' is such that domains tend to occupy either side of the groove as they propagate along the groove in accordance with essentially the same principles as detailed in the foregoing description. Consecutive stable positions for domains are defined at the points along the serrated groove which are concave with respect to the center of the groove, as illustrated in FIG. 4 by domain positions $D_0''$, $D_1''$, $D_2''$, $D_3''$, $D_4''$, $D_5''$, and $D_6''$.

The "writing" process for the groove geometry is effected in the same manner as with the rail. The plot of a train of propagation current pulses $i_p$, comprising pulses $P_1$, $P_2$, $P_3$, $P_4$, $P_5$, and $P_6$, previously shown and described with respect to FIG. 2, are included in FIG. 4 to illustrate the movement of a single domain corresponding to the "writing" of a binary "1."

A variety of advantages arise from this new "writing" arrangement. Most importantly, the need for independent external "write" conductors has been eliminated. Secondly, relatively little additional current is required to effect a "writing" operation by enhancing the amplitude of the normal propagation current pulse. In practice, $I_1$ and $I_0$ are usually each required to be of the order of $2I_p$ to $3I_p$ when the lateral dimensions of the "write" positions are reduced by about a factor of two with respect to the lateral dimensions at the other positions. Thirdly, the "writing" arrangement is easily incorporated into a system where there is no need to continually generate or annihilate domains.

It is, therefore, apparent that an enhanced propagation-pulse "write" feature has been provided in accordance with the invention that fully satisfies the objects, aims, and advantages set forth in the foregoing description of the invention. While the invention has been described and illustrated in conjunction with specific embodiments it is evident that there are many alternatives, modifications, and variations thereof which will be apparent to those skilled in the art in light of the foregoing description and fall within the spirit and scope of the invention.

What is claimed is:

1. A single-wall magnetic domain apparatus, comprising:

a layer of material in which single-wall magnetic domains can be moved;

means for defining a domain propagation channel in said layer;

means for defining a sequence of consecutive domain positions along said channel, said channel being characterized by a first stable domain location on one side of said channel at each of said positions, and a second stable domain location on the other side of said channel at each of said positions, said locations at each of said positions being substantially laterally displaced with respect to the direction of domain propagation in said channel; and means for providing a sequence of consecutively offset magnetic fields for moving a domain along said positions in response to a sequence of first propagation pulses of a predetermined amplitude and second propagation pulses of a different amplitude, such that domain movement between consecutive positions in said channel is constrained to movement between locations on the same side of said channel in response to said first pulses and to movement between locations on opposite sides of said channel at at least one of said positions in response to said second pulses.

2. The single-wall magnetic domain apparatus in accordance with claim 1, in which said means for defining said sequence of consecutive domain positions comprises means for generating at a selected position a force sufficient to laterally displace a domain at such position from one of said locations to the other in response to one of said second propagation pulses, said second pulses each having a larger amplitude with respect to said predetermined amplitude of said first propagation pulses.

3. The single-wall magnetic domain apparatus in accordance with claim 2, in which said generating means comprises a propagation conductor pattern that repeatedly crosses said channel, the lateral dimensions of said conductor pattern at said selected position being sufficiently reduced with respect to the lateral dimensions of said conductor pattern at others of said positions to provide said displacement force in response to one of said second propagation pulses.

4. The single-wall magnetic domain apparatus in accordance with claim 3 in which the lateral dimensions of said conductor pattern at said positions other than said selected position are sufficient to preclude lateral displacement of domains at such positions in response to either said first pulses or said second pulses.

5. The single-wall magnetic domain apparatus in accordance with claim 4 in which said lateral dimensions of said conductor pattern at said selected position are reduced on a predetermined side of said channel so that displacement of a domain to said predetermined side at said selected position occurs in response to one of said second propagation pulses having a predetermined corresponding polarity.

6. The single-wall magnetic domain apparatus in accordance with claim 2 in which said generating means comprises a conductor pattern having a substantially serpentine geometry suitable for generating a pattern of attracting and repelling magnetic fields along said channel, for sequentially propagating domains between said positions in said channel in response to said first pulses having alternating polarity;

said serpentine geometry of said conductor pattern at said selected position having reduced dimensions, with respect to corresponding dimensions of said serpentine geometry at others of said positions, in a direction at substantially right angles with respect to the direction of domain propagation along said channel;

said channel being of a suitable material and geometry to define first and second sides thereof and to constrain domains to propagate along either of said sides without switching sides in response to said first pulses; and said reduced dimensions of said serpentine geometry at said selected position being sufficiently reduced to effect the binary "write" function by displacing a domain propagating into such position from said first side to said second side of such position in response to one of said second pulses having a predetermined polarity.

7. The single-wall magnetic domain apparatus in accordance with claim 6 in which said channel comprises a magnetically soft rail with a predetermined thickness and a lateral width less than the diameter of a domain in said layer of material.

8. The single-wall magnetic domain apparatus in accordance with claim 6 in which said channel comprises a serrated groove of a predetermined width and depth in said layer of material.

9. The single-wall magnetic domain apparatus in accordance with claim 3 in which:

said conductor pattern having reduced lateral dimensions in a first lateral direction at a first one of said positions whereby a domain in said first location at said first position moves to said second location of said first position in response to one of said second propagation pulses when such pulse is of a positive polarity; and said conductor pattern having reduced lateral dimensions in a second lateral direction at a second one of said positions whereby a domain in said second location at said second position moves to said first location of said second position in response to one of said second propagation pulses when such pulse is of a negative polarity.

10. In combination:

a layer of material in which single-wall magnetic domains are movable;

means for defining a domain propagation channel in said layer;

a conductor pattern having first and second geometries defining domain positions along said channel, said first and second geometries comprising patterns that cross said channel and the lateral dimensions of said second geometry being reduced with respect to the lateral dimensions of said first geometry; and means for providing first and second pulses to said conductor pattern, such that a domain moves along one side of said channel in response to one of said first pulses and moves from one side to the other side of said channel at a position defined by said second geometry in response to one of said second pulses.

* * * * *